(12) United States Patent
Garcia-Saavedra et al.

(10) Patent No.: US 10,667,258 B2
(45) Date of Patent: May 26, 2020

(54) SYSTEM AND METHOD FOR IMPROVING TRANSMISSION IN WIRELESS NETWORKS

(71) Applicant: NEC Europe Ltd., Heidelberg (DE)

(72) Inventors: Andres Garcia-Saavedra, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 15/838,381

(22) Filed: Dec. 12, 2017

(65) Prior Publication Data

US 2019/0182828 A1    Jun. 13, 2019

(51) Int. Cl.
*H04W 72/04* (2009.01)
*H04W 74/08* (2009.01)
(Continued)

(52) U.S. Cl.
CPC ....... *H04W 72/0446* (2013.01); *H04W 28/26* (2013.01); *H04W 72/0453* (2013.01);
(Continued)

(58) Field of Classification Search
None
See application file for complete search history.

(56) References Cited

U.S. PATENT DOCUMENTS

| | | | | |
|---|---|---|---|---|
| 2012/0045005 A1* | 2/2012 | Kim | .................. | H04W 52/0216 375/260 |
| 2013/0021999 A1* | 1/2013 | Jiang | ....................... | H04L 5/006 370/329 |

(Continued)

FOREIGN PATENT DOCUMENTS

| | | |
|---|---|---|
| WO | WO 2016000796 A1 | 1/2016 |
| WO | WO 2017133778 A1 | 8/2017 |

OTHER PUBLICATIONS

Draft ETSI EN 301 893 V2.0.7 (Nov. 2016); "5 GHz RLAN; Harmonised Standard covering the essential requirements of article 3.2 of Directive 2014/53/EU", Nov. 2016, pp. 1-123.

(Continued)

*Primary Examiner* — Jeffrey M Rutkowski
*Assistant Examiner* — Ning Li
(74) *Attorney, Agent, or Firm* — Leydig, Voit & Mayer, Ltd.

(57) ABSTRACT

A method for operating a plurality of different wireless networks operating at least in part in overlapping frequency bands includes monitoring, by a first wireless transmitter, activity in the overlapping frequency bands. The first wireless transmitter determines whether a channel in the overlapping frequency bands is idle for a predefined time period. Based on the channel being idle for the predefined time period, it is determined that the first wireless transmitter has a transmission opportunity on the channel. The first wireless transmitter measures an amount of time until a next frame boundary on the channel and, based on the amount of time until the next frame boundary being below a threshold, reserves the channel for a fixed duration of time. Based on the amount of time until the next frame boundary being above the threshold, the first wireless transmitter skips the transmission opportunity on the channel.

13 Claims, 8 Drawing Sheets

(51) Int. Cl.
*H04W 74/04* (2009.01)
*H04W 28/26* (2009.01)

(52) U.S. Cl.
CPC ....... *H04W 74/04* (2013.01); *H04W 74/0808* (2013.01); *H04W 72/0486* (2013.01)

(56) References Cited

U.S. PATENT DOCUMENTS

| | | | |
|---|---|---|---|
| 2015/0312940 A1* | 10/2015 | Xing | H04W 74/0816 370/329 |
| 2016/0174222 A1 | 6/2016 | Zhang et al. | |
| 2016/0192363 A1* | 6/2016 | Kasher | H04L 5/00 370/329 |
| 2016/0262170 A1* | 9/2016 | Lee | H04W 16/14 |
| 2017/0055296 A1* | 2/2017 | Cheng | H04W 74/0841 |
| 2017/0142746 A1* | 5/2017 | Koorapaty | H04W 16/14 |
| 2017/0171773 A1* | 6/2017 | Cariou | H04W 74/0841 |
| 2017/0202022 A1* | 7/2017 | Chendamarai Kannan | H04W 72/0446 |
| 2017/0238310 A1* | 8/2017 | Huang | H04L 43/16 370/329 |
| 2017/0290045 A1* | 10/2017 | Nair | H04B 7/0452 |
| 2017/0325098 A1 | 11/2017 | Kwan et al. | |
| 2018/0020359 A1* | 1/2018 | Belghoul | H04L 5/0062 |
| 2018/0167997 A1* | 6/2018 | Yoshimura | H04W 28/06 |
| 2018/0376339 A1* | 12/2018 | Hu | H04W 16/14 |
| 2019/0182865 A1* | 6/2019 | Falahati | H04W 74/085 |

OTHER PUBLICATIONS

IEEE Std 802.11 ac™—2013; "Part 11: Wireless LAN Medium Access Control (MAC) and Physical Layer (PHY) Specifications"; Amendment 4: Enhancements for Very High Throughput for Operation in Bands below 6 GHz; IEEE Standard for Information technology—Telecommunications and information exchange between systems Local and metropolitan area networks—Specific requirements, Dec. 2013, pp. 1-425.

Giuseppe Bianchi, "Performance Analysis of the IEEE 802.11 Distributed Coordination Function", IEEE Journal on Selected Areas in Communications, vol. 18, No. 3, Mar. 3, 2000, pp. 1-13.

3GPP TR 36.889 V13.0.0 (Jun. 2015); 3$^{rd}$ Generation Partnership Project; Technical Specification Group Radio Access Network; Study on Licensed-Assisted Access to Unlicensed Spectrum; (Release 13), Jun. 2015, pp. 1-87.

T. S. Ferguson, "Optimal Stopping and Applications; Chapter 1. Stopping Rule Problems", UCLA 2008, Dec. 2008, pp. 1-8.

* cited by examiner

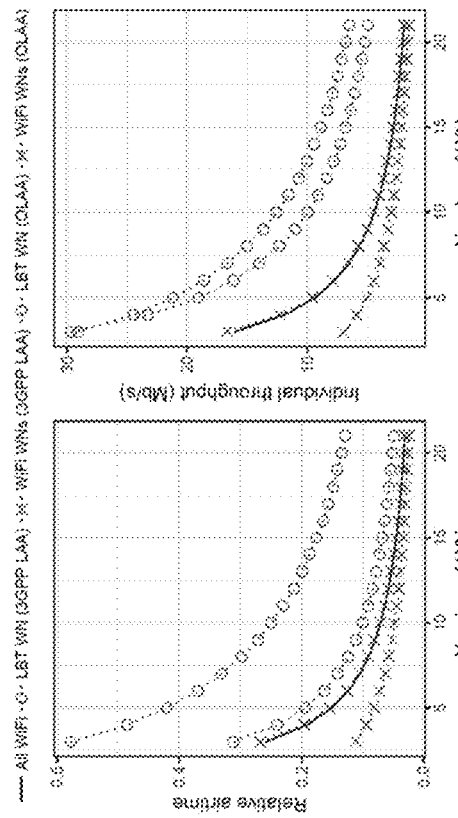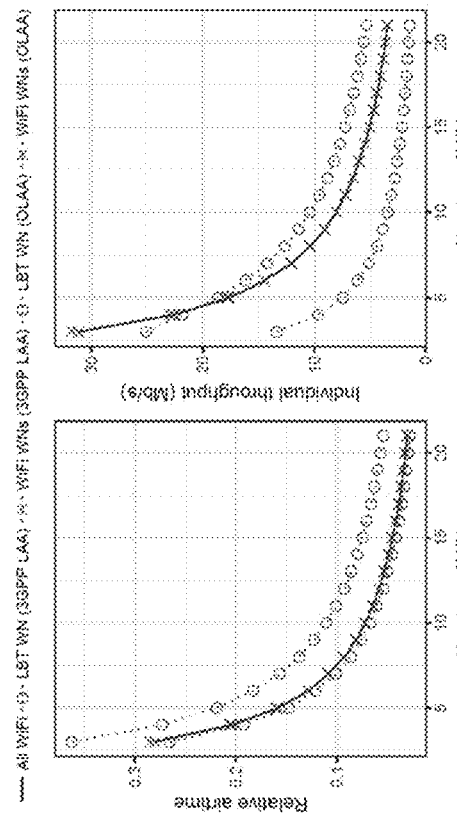
Fig. 4(a) Asynchronous LBT, WiFi MPDU = 1500B, LBT Frame size = 1ms.
Fig. 4(b) Synchronous LBT, WiFi MPDU = 1500B, LBT Frame size = 1ms.
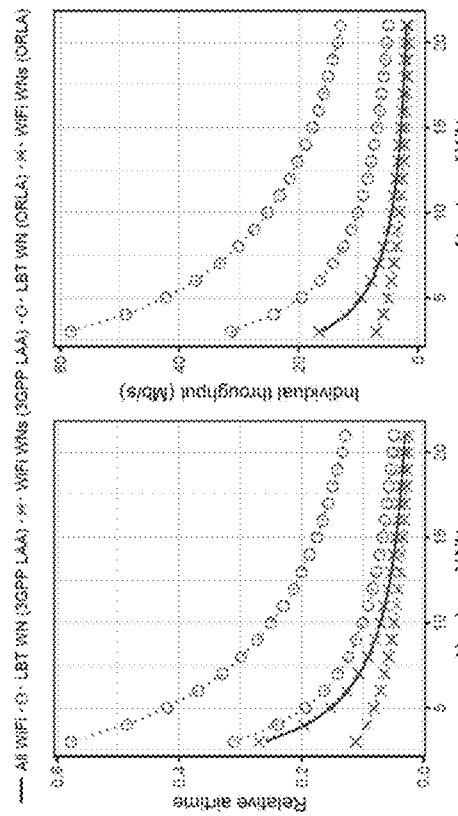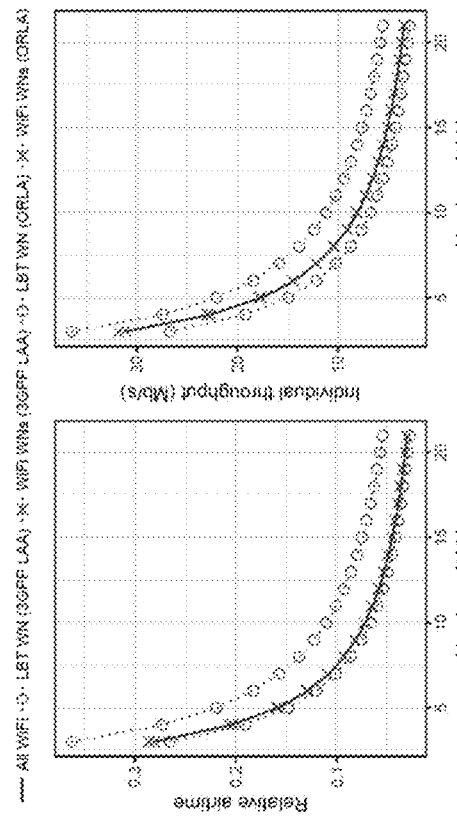
Fig. 4(c) Asynchronous LBT, WiFi MPDU = 1500B, LBT Frame size = 1ms.
Fig. 4(d) Synchronous LBT, WiFi MPDU = 1500B, LBT Frame size = 1ms.

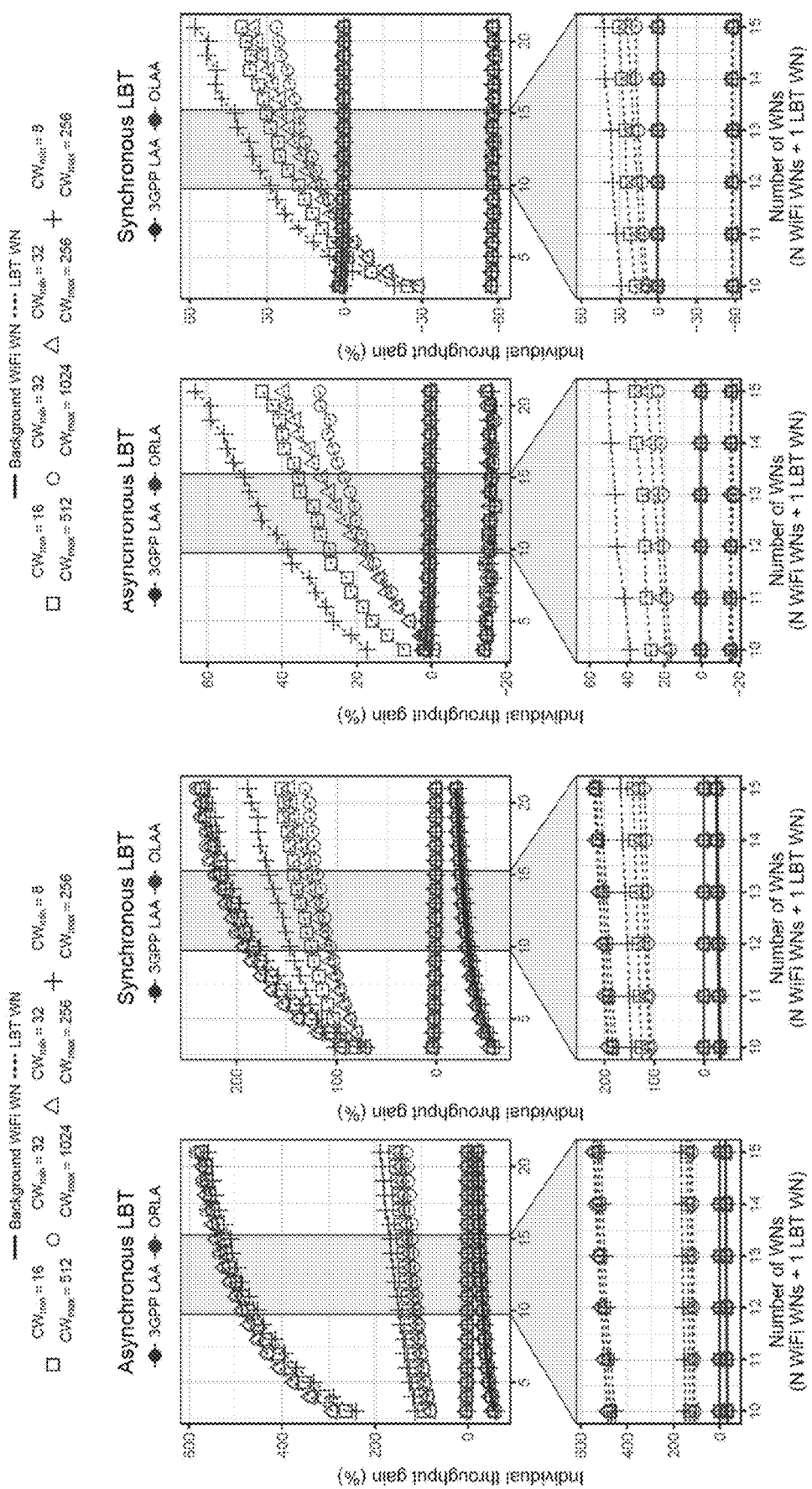
Fig. 5(a) WiFi MPDU = 1500B, LBT Frame size = 1ms.
Fig. 5(b) WiFi MPDU = 1500B, LBT Frame size = 1ms.

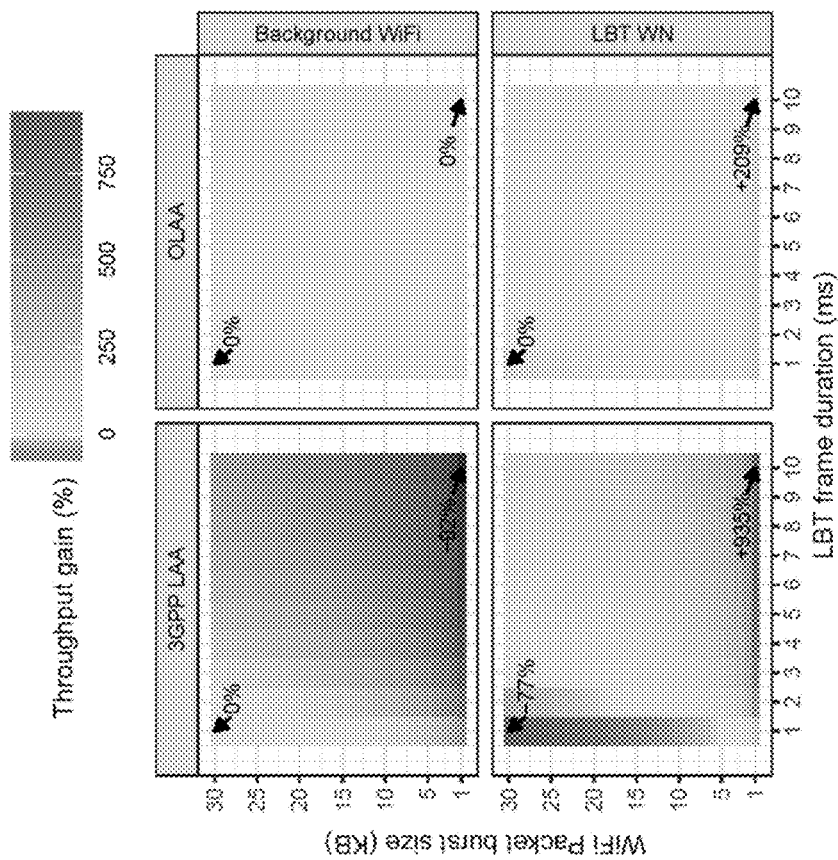
Fig. 6(b) Synchronous LBT.
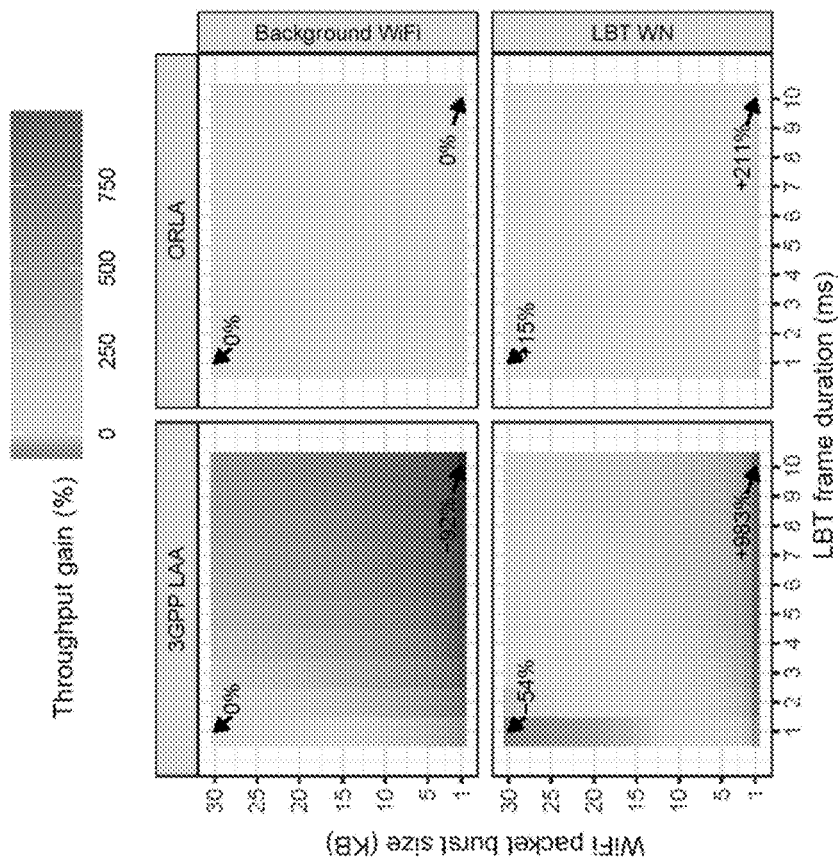
Fig. 6(a) Asynchronous LBT.

SYSTEM AND METHOD FOR IMPROVING TRANSMISSION IN WIRELESS NETWORKS

FIELD

The present invention relates to a method for operating a plurality of wireless networks, comprising at least two different wireless networks operating at least in part in overlapping frequency bands. Although applicable to wireless networks in general, the present invention will be described with regard to Long-Term Evolution (LTE)-based networks and Wireless Local Area Network (WLAN) IEEE 802.11-based networks. Also, although applicable in general to any kind of frequency bands, the present invention will be described with regard to LTE-unlicensed bands.

BACKGROUND 5G radio access network (RAN) architects actively seek to augment mobile systems with inexpensive spectrum portions, in order to boost network capacity and meet growing user demand in a cost-effective manner. License-exempt 5-GHz Unlicensed National Information Infrastructure (U-NII) channels, currently exploited almost exclusively by Wi-Fi deployments, are of particular interest to the 3rd Generation Partnership Project (3GPP) community, who is pursuing Long-Term Evolution (LTE) standardization in the unlicensed arena (U-LTE). However, the substantial differences between incumbent Wi-Fi, which employs a listen-before-talk (LBT) contention-based multiplexing protocol (CSMA/CA), and LTE, which is inherently a scheduled paradigm, makes the design of U-LTE channel access protocols particularly challenging.

SUMMARY

An embodiment of the present invention provides a method for operating a plurality of wireless networks, comprising at least two different wireless networks operating at least in part in overlapping frequency bands. A first wireless transmitter in a first one of the wireless networks monitors activity in the overlapping frequency bands. The first wireless transmitter determines whether a channel in the overlapping frequency bands is idle for a predefined time period. Based on the channel being idle for the predefined time period, it is determined that the first wireless transmitter has a transmission opportunity on the channel. The first wireless transmitter measures an amount of time until a next frame boundary on the channel and, based on the amount of time until the next frame boundary being below a threshold, reserves the channel for a fixed duration of time. Data is transmitted at the next frame boundary. Based on the amount of time until the next frame boundary being above the threshold, the first wireless transmitter skips the transmission opportunity on the channel and waits for a next transmission opportunity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 4a-4d show exemplary simulation results according to an embodiment of the invention;

FIGS. 5a-5b show exemplary simulation results according to an embodiment of the invention;

FIGS. 6a-6b show exemplary simulation results according to an embodiment of the invention;

DETAILED DESCRIPTION

Figure 1:
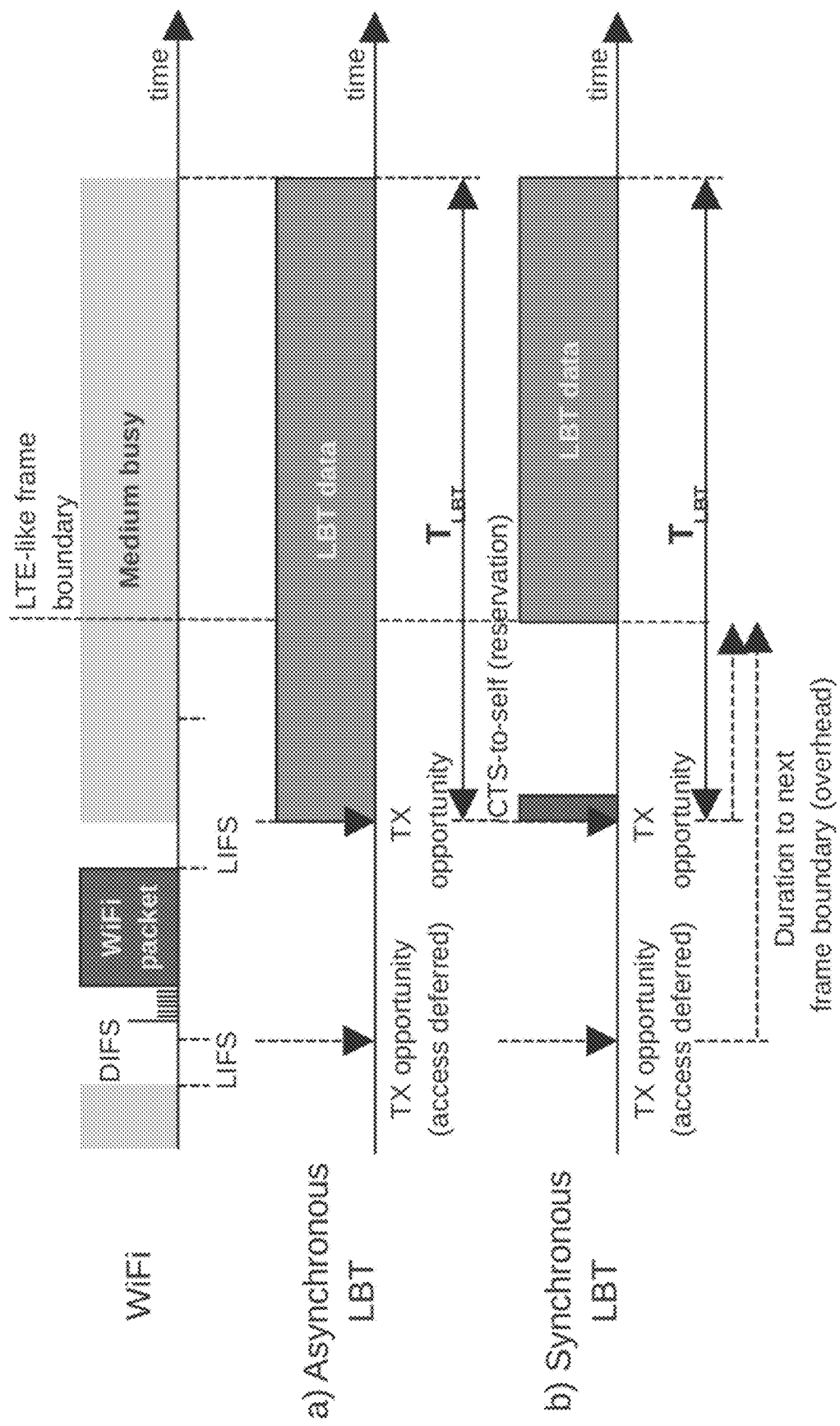
FIG. 1 illustrates a synchronous LBT protocol compared with a Wi-Fi wireless network protocol and an asynchronous LBT protocol according to an embodiment of the invention.

A problem unique to unlicensed LTE (U-LTE) network design is how to exploit license-exempt 5-GHz U-NII channels efficiently whilst playing fair to native technologies already inhabiting these channels. Prior U-LTE solutions employ a Carrier Sensing and Adaptive Transmission (CSAT) scheme based on channel selection and time-based duty cycling. The scheme ensured short time to market in some countries (USA, Korea, India), but is unable to abide to LBT regulation in regions such as Europe and Japan. More recent 3GPP specifications put forward an LBT-based solution named Licensed-Assisted Access (LAA) to address this problem. The LBT flavor of LAA is essentially similar to that of Wi-Fi CSMA/CA, thereby enabling global U-LTE deployment.

Despite these standardization efforts, the impact an emerging LTE contender may have on Wi-Fi technologies native to unlicensed bands, has been consistently scrutinized. It has been illustrated that 3GPP's LAA fails to meet one or both of the following coexistence design criteria: (1) not harming the performance of preexisting Wi-Fi wireless nodes (WNs), and (2) providing superior medium access control (MAC) protocol efficiency as compared to Wi-Fi. Since 3GPP's LAA fundamentally resembles Wi-Fi's CSMA/CA access procedure, 3GPP's LAA is unable to provide fairness, thus, potential MAC efficiency gains are achieved at the cost of bringing havoc onto Wi-Fi communication in these license-exempt channels.

U-LTE may provide enhanced physical layer (PHY-layer) efficiency (e.g., more robust error recovery mechanisms) and operational advantages to cellular carriers (e.g., common radio resource management with licensed LTE), and as such, substantial opportunities exist to improve MAC-layer coexistence alone and satisfy the aforementioned coexistence design criteria at the same time. Therefore, embodiments of the invention utilize a different approach to MAC coexistence design of a U-LTE based upon the recognition by the inventors that if the airtime used by Wi-Fi and U-LTE were perfectly decoupled so that inter-technology collisions are eliminated, U-LTE access schemes that employ transmission strategies that are demonstrably harmless to Wi-Fi can be built. Additionally, these access schemes may be shown to achieve higher data rates compared to CSMA/CA-based alternatives for cellular access to unlicensed spectrum. These alternatives include LTE-WLAN aggregation (LWA or LTE-H) and the already mentioned 3GPP LAA.

Embodiments of the present invention may provide an unlicensed LTE (U-LTE) transmitter that exhibits the following qualities: (1) The U-LTE transmitter does not harm incumbent Wi-Fi networks thereby fairly coexisting with the incumbent Wi-Fi networks by impacting the networks' performance in a similar manner as another Wi-Fi device; and (2) realizing an improved media access control (MAC) efficiency compared to MAC protocols of Wi-Fi and 3GPP licensed-assisted access (LAA) schemes. Embodiments of the present invention provide an optimal transmission policy for satisfying the aforementioned qualities (1) and (2) and maximizing throughput when a U-LTE transmitter is synchronized with its licensed counterpart.

In an embodiment, the present invention provides a method for operating a plurality of wireless networks, comprising at least two different wireless networks operating at least in part in overlapping frequency bands. The method comprises: monitoring, by a first wireless device in a first one of the wireless networks, activity in the overlapping frequency bands; determining, by the first wireless device, whether a channel in the overlapping frequency bands is idle for a predefined time period; based on the channel being idle for the predefined time period, determining that the first wireless device has a transmission opportunity on the channel; measuring, by the first wireless device, an amount of time until a next frame boundary on the channel; based on the amount of time until the next frame boundary being below a threshold, reserving, by the first wireless device, the channel for a fixed duration of time, and transmitting data at the next frame boundary; and based on the amount of time until the next frame boundary being above the threshold, skipping, by the first wireless device, the transmission opportunity on the channel and waiting for a next transmission opportunity.

The method minimizes wastage of radio resources due to blocking airtime without transmitting. Another advantage provided by the method includes minimizing overhead in synchronous U-LTE systems and as a result, maximizing throughput as compared to conventional approaches. While allowing the different networks with overlapping frequency bands to completely coexist, the method achieves significant throughput gains, as quantitatively demonstrated herein. Thus, the method improves computer networks, in particular wireless networks and especially U-LTE networks, by facilitating communication in overlapped bands to reduce radio resource waste and increase MAC layer throughput.

The European Telecommunications Standards Institute (ETSI), in the ETSI 301 893 standard, specifies that a load based equipment (LBE) may implement the LBT based spectrum sharing mechanism following the Clear Channel Assessment (CCA) mode using energy detection. Energy detection refers to observing an operating channel for a pre-defined duration and determining whether the energy level sensed exceeds a sensitivity threshold. When the sensitivity threshold is exceeded, the channel is regarded as busy and transmission is deferred. ETSI mandates that CCA assertion can be performed in accordance with the provisions of IEEE 802.11 standard. Alternatively, minimum requirements should be met, as defined by two channel access options stipulated in this directive.

LBE does not follow a fixed transmit/receive (TX/RX) pattern, but is driven by demand. In contrast, a frame based equipment (FBE) transmits at fixed intervals. LBE paradigm allows for opportunistically exploiting a medium for LTE transmissions. In one embodiment, LBT WNs comply with clause 18 of IEEE 802.11, which requires that orthogonal frequency-division multiplexing (OFDM) transmitters identify a busy channel within 4 microseconds. Clause 18 also requires that a Wi-Fi station operating in the 5 GHz band observe that the channel is idle for at least a distributed inter-frame space (DIFS) of 34 microseconds before attempting to transmit. Furthermore, 802.11 data frames and acknowledgements (ACKs) are separated by short inter-frame space (SIFS) of 16 microseconds.

LBT WNs are allowed to attempt transmission following an 802.11 frame exchange, immediately after the channel is sensed idle for an LTE inter-frame space (LIFS) of 20 microseconds. This may be used to ensure that an 802.11 frame exchange is not interrupted, while avoiding potential collisions with co-existing 802.11 stations (which may transmit immediately after DIFS, if initializing random back-off counters with zero).

Wi-Fi medium access is regulated by the IEEE 802.11 distributed coordination function (DCF), which performs CSMA/CA with Binary Exponential Backoff (BEB). An IEEE 802.11 network divides time into MAC slots; and a station transmits, after observing $S_m$ idle slots, where $S_m$ is a random variable selected uniformly at random from $\{0, 1, \ldots, 2^m CW_{min}-1\}$ where $CW_{min}$ is the minimum contention window and m=0, 1, 2, . . . is the number of successive collisions experienced by the station. After a successful transmission, m is set to 0. IEEE 802.11 defines a parameter $CW_{max}$ that limits the expected number of idle slots a station has to wait after m successive collisions, i.e., $2^k CW_{min} = CW_{max}$ for m≥k.

Embodiments of the invention utilize two features of Wi-Fi systems: (1) each 802.11 packet includes, in the header, information regarding the duration of the transmission, i.e., upon correct reception of a packet, a station knows the duration for which the channel will be busy; (2) after a successful transmission all stations in the network wait for an arbitration inter-frame spacing (AIFS) time of at least 34 microseconds. The AIFS time corresponds to the DIFS in DCF-based devices, and in the 5 GHz bands, AIFS has a duration of at least 34 microseconds. That is, after each successful transmission there will be at least 34 microseconds during which the channel is free of Wi-Fi transmissions.

It is possible to create orthogonal airtime chunks for Wi-Fi and the advent of new LBT-enabled transmitters like U-LTE. This provides a coexistence approach which builds upon the observation that the minimum duration of a DIFS/AIFS (34 microseconds) is longer than the CCA minimum time (20 microseconds) specified by ETSI. More specifically, to avoid inter-technology collisions, an LBT WN can acquire the channel if the medium is sensed idle for an LBT inter-frame space (LIFS) of 20 microseconds duration. Note that SIFS<LIFS<PIFS (<AIFS/DIFS), which means LBT transmissions take priority, but cannot interrupt ongoing data-ACK exchanges (which are separated by a SIFS) in concurrent Wi-Fi transmissions. Thus, allowing idle channel acquisition after LIFS enables an LBT system to opportunistically exploit orthogonal collision-free airtime in unlicensed spectrum. The LIFS period after a successful Wi-Fi transmission may be referred to as an LBT transmission opportunity.

A parameter ρ is introduced to control the access of this mechanism: the fraction of idle slots that would change to busy slots with U-LTE transmissions when using the above mechanism. Three implementation examples are provided:
  a. Duty cycle-based: A number Δ representing a period of AIFS opportunities is defined. An LBT-node may transmit after every AIFS opportunity during a total number of $\pi\Delta$ opportunities (This is an "on" period). The LBT-node may skips the next $(1-\pi)\Delta$ opportunities.
  b. Aloha-based: An LBT-node transmits at every AIFS opportunity with probability $\pi$.
  c. DCF-based: An LBT-node chooses a contention window uniformly at random between $$\left[0, \frac{2}{\pi} - 1\right]$$

and sets a backoff counter to this number every time it seeks to transmit data. The backoff counter is decremented for every AIFS opportunity until it reaches zero when it transmits.

In the above examples, $$\pi = \min\left(1, \rho \frac{P_{idle}^{(n)}}{1 - P_{idle}^{(n)}}\right),$$

and $P_{idle}^{(n)}$ is the probability that a Wi-Fi slot is idle, which can be measured or computed with standard models. The International Patent Publication WO2017/133778, which is hereby incorporated by reference herein in its entirety, proposes a way to compute $\rho$ such that the aforementioned design criteria are met for asynchronous operation.

Embodiments of the invention provide a transmission policy that minimizes transmission overhead upon synchronous operation, when a U-LTE transmitter waits for a beginning of a (licensed) LTE frame boundary to transmit data. FIG. 1 illustrates an exemplary embodiment of a synchronous protocol operation by a synchronous LBT compared with a Wi-Fi WN protocol and an asynchronous LBT WN protocol. After a busy period with the channel being occupied by Wi-Fi WNs, LBT WNs have a transmission opportunity. In the embodiment of FIG. 1, the first transmission opportunity is skipped due to, e.g., coexistence, and the second opportunity is taken. In the case of asynchronous access, the LBT WN delivers data immediately at during the second transmission opportunity. This case is contrasted with that of synchronous access where, during the second opportunity, the channel is reserved (via a Clear-to-Send (CTS)-to-self message) and data is sent at the boundary of the next frame.

As shown in FIG. 1, an 802.11-compliant CTS-to-self mechanism is employed to support the case of synchronous LBT WNs that postpones data transmissions until the beginning of a frame. The mechanism allows reserving the channel and addressing a frame alignment problem. Specifically, if the synchronous LBT WN senses the channel idle for LIFS time after a busy period, it can choose to send a CTS-to-self to reserve the medium before the next frame, or defer access until a next transmission opportunity. In either case, when an asynchronous/synchronous LBT WN decides to acquire the channel, it will hold the channel for a fixed duration $T_{LBT}$, as permitted by regulations for both FBE or LBE.

Embodiments of the invention minimize amount of channel wastage due to awaiting the LTE frame boundary by utilizing a transmission policy including: (1) defining a new parameter $T_{res}$ as the amount of time between a LIFS transmission opportunity and the beginning of an LTE frame boundary; and (2) Upon a LIFS transmission opportunity, the LBT WN measures $T_{res}$ and the LBT WN transmits if and only if $T_{res} < \alpha$. In order to satisfy the fairness criteria for incumbent Wi-Fi devices (as summarized above), $\alpha$ is determined as a function of $\rho$.

As explained above, an LBT WN decides every LIFS opportunity whether to transmit data or not. If the LBT WN decides to transmit at a LIFS opportunity $\omega$, a synchronous LBT WN will transmit useful data for an amount of time equal to $Y^{(\omega)} = T_{LBT} - T_{res}$, where $T_{res}$ is the (random) time it takes between a LIFS opportunity and the closest frame boundary (see FIG. 1). If the LBT WN chooses not to transmit, it skips a round and waits for the next LIFS opportunity $\omega+1$ or round. This may be viewed as an investment of time on each LIFS opportunity $\omega$ yielding a gross gain equal to $Y^{(\omega)}$ of useful channel time. Since this process is repeated over time, embodiments of the disclosure provide a policy $\Pi$ that maximizes an expected long-term rate of return. Note that a naive policy that transmits at all LIFS opportunities will not necessarily maximize the rate of return of a synchronous LBT WN, as the amount of time wasted by awaiting frame boundaries may exceed the time invested in skipping LIFS opportunities.

Suppose now that the above process is repeated K times. Let $\{\omega_1, \ldots, \omega_k\}$ denote LIFS opportunities that have been taken (referred to as stopping times), $Y^{(\omega_k)}$ denote the useful channel time obtained in opportunity $\omega_k$, and $\psi^{(\omega_k)}$ denote the time invested to do so. Then, by the law of large numbers $$\frac{\sum_{i=1}^{K} Y^{(\omega_i)}}{\sum_{i=1}^{K} \psi^{(\omega_i)}} \to \frac{E[Y_\Pi]}{E[\psi_\Pi]} \; a.s.$$

Then, the problem of maximizing the long-term average goodput of the synchronous LBT WN can be cast as a maximal-rate-of-return problem, and optimal stopping theory may be used to solve the resulting problem. That is, an optimal stopping rule $\Pi^{\ddagger}$ may be characterized as $$\Pi^{\ddagger} := \underset{\Pi \in \pi}{\mathrm{argmax}} \frac{E[Y_\Pi]}{E[\psi_\Pi]}$$

and the optimal LBT WN goodput may be characterized as $$\lambda^{\ddagger} := \underset{\Pi \in \pi}{\sup} \frac{E[Y_\Pi]}{E[\psi_\Pi]}$$

Now, following, the maximal-rate-of-return problem can be transformed into the following ordinary stopping rule problem:

$$\max E\left[Y_\Pi - \lambda\left(\sum_{i=1}^{\omega \in \Pi} T_{slot} K^{(i)} + T_{LBT}\right)\right]$$

where $K_t$ is the number of Wi-Fi slots between LIFS opportunity i and i-1, and $T_{slot}$ is the average duration of a slot (successful/collision/idle) of a Wi-Fi WN which can be computed with standard models. The intuition behind the above problem is that $$c_\Pi := \lambda \sum_{i=1}^{\Pi} T_{slot} K^{(i)}$$

is invested and $X_\Pi := Y_\Pi \lambda T_{LBT}$ is gained in return, when the stopping rule $\omega \in \Pi$ is used. Then, the optimal rule $\Pi^\ddagger$ and the optimal throughput is such that $$V^\ddagger(\lambda^\ddagger) := \sup_{\Pi \in \pi} E[Y_\Pi - \lambda \psi_\Pi] = 0.$$

It can be shown then that the stopping rule is $$\Pi^\ddagger = \min\{\omega \geq 1 | X_\Pi \overset{\vartheta}{\vee} V^\ddagger\}$$

and that $V^\ddagger$ satisfies the optimality equation:

$$V^\ddagger = E[\max\{X^{(1)}, V^\ddagger\}] - c^{(1)}.$$

Given that $V^\ddagger(\lambda^\ddagger) = 0$ and that $Y_\Pi$ is i.i.d, the above becomes $$E\left[\max\left\{Y - \lambda^\ddagger\left(\frac{T_{slot}}{1-P_{idle}} + T_{LBT}\right), -\lambda^\ddagger \frac{T_{slot}}{1-P_{idle}}\right\}\right] = 0$$

since $$E[K] = \frac{1}{1 - P_{idle}},$$

and hence $$E[Y - \lambda^\ddagger T_{LBT}]^+ = \lambda^\ddagger \frac{T_{slot}}{1 - P_{idle}}$$

which is a fixed point equation that can be solved with iterative methods, and the optimal rule renders $$\Pi^\ddagger = \min\{\omega \geq 1 \mid Y_\Pi \geq \lambda^\ddagger T_{LBT}\}$$
$$= \min\{\omega \geq 1 \mid T_{res} < T_{LBT}(1 - \lambda^\ddagger)\}$$

In addition to finding the stopping policy that maximizes the rate of return, the conditions established above may be guaranteed as well, i.e., the ratio of used LIFS opportunities should not exceed $$\pi = \min\left(1, \bar{\rho}\frac{P_{idle}^{(n)}}{1 - P_{idle}^{(n)}}\right)$$

where $\bar{\rho}$ is the maximum fraction of idle Wi-Fi slots that would change to busy slots with U-LTE transmissions under the asynchronous access mechanism, as shown in FIG. 1 and computed in International Patent Publication WO2017/133778. In order to accommodate such constraint, the following lemma is introduced:

Lemma 1. $T_{res}$ is uniformly distributed between 0 and $T_{LBT}$.

Proof. Provided is a time-slotted system $t = 1, 2, \ldots$, with each slot containing an idle, collision or successful Wi-Fi event. Let $X := \langle X_1, X_2, \ldots \rangle$ be a sequence of slots where $X_i$ is a Bernoulli trial with probability $q = 1 - P_{idle}$, i.e., a successful trial is a LIFS opportunity. This corresponds to a Bernoulli process $S(t) := \Sigma_{i=1}^t X_i$ such the probability of having K LIFS opportunities in t slots follows a binomial probability distribution, i.e., $P(S(t)=K) = \mathcal{B}(t,K)$, and the number of slots between two LIFS opportunities follows a geometric distribution. Let now $L := \langle \delta \cdot T_{LBT} \rangle$ be the sequence of slots containing an LTE-like frame boundary for $\delta = 1, 2, \ldots$. Now, let $T^{(\omega)}$ denote the (random) slot in which LIFS opportunity $\omega$ occurs. Since in order to be a LIFS opportunity, the opportunity should occur within the interval $[(\delta-1)T_{LBT}, \delta T_{LBT})$, $\delta = 1, 2, \ldots$, and the conditional distribution of $T^{(\omega)}$ may be computed. Since $$P(T^{(\omega)} \leq t \mid \mathcal{B}(T_{LBT}, 1)) = \frac{P(T^{(\omega)} \leq t, \mathcal{B}(T_{LBT}, 1))}{\mathcal{B}(T_{LBT}, 1)}$$
$$= \frac{tq(1-q)^{t-1}(1-q)^{T_{LBT}-t}}{tq(1-q)^{T_{LBT}-1}}$$
$$= \frac{t}{T_{LBT}}$$

is the cumulative distribution function (CDF) of an uniform distribution, $T_{res} = L^{(\omega)} - T^{(\omega)}$ (L is not a random process), is also uniformly distributed between 0 and $T_{LBT}$. This finishes the proof.

Since $T_{res}$ is uniformly distributed between 0 and $T_{LBT}$, it is sufficient to simply consider those LIFS opportunities closer than $\pi(\rho)T_{LBT}$ slots to a frame boundary, that is, $$T_{res} < \pi(\bar{\rho})T_{LBT}.$$

The above leads to the following theorem describing an optimal policy for synchronous LBT systems named "Orthogonal Licensed-Assisted Access" or OLAA.

Let an OLAA policy $\Pi^{OLAA}$ be defined as a transmission policy where a synchronous LBT transmitter initiates transmission according to the following rule:

$$\Pi^{OLAA}(\lambda, \rho) := \{\Pi \geq 1 | T_{res} < \min(T_{LBT}(1-\lambda), \pi(\rho)T_{LBT})\}.$$

In an embodiment, the optimal α is given by $$\alpha = \min(T_{LBT}(1-\lambda), \pi(\rho)T_{LBT})$$

where λ is computed by solving for $\Pi^\ddagger$, and $\pi(\rho)$ is already previously described. α is determined as the minimum between (1) an optimal point between the investment of time when skipping transmission opportunities and choosing a transmission opportunity that is near a frame boundary, and (2) the fraction of transmission opportunities nearer a frame boundary that respects a fairness criteria, i.e., $\pi(\rho)$.

Embodiments of the invention provide a probability-based transmission decision policy (optimal stopping theory) for synchronous U-LTE MAC protocols. The embodiments further provide optimal configuration of the transmission policy to minimize wastage of radio resources due to blocking airtime without transmitting. An advantage provided by embodiments of the invention includes minimizing overhead in synchronous U-LTE systems and as a result maximizing throughput as compared to conventional approaches.

Figure 2:
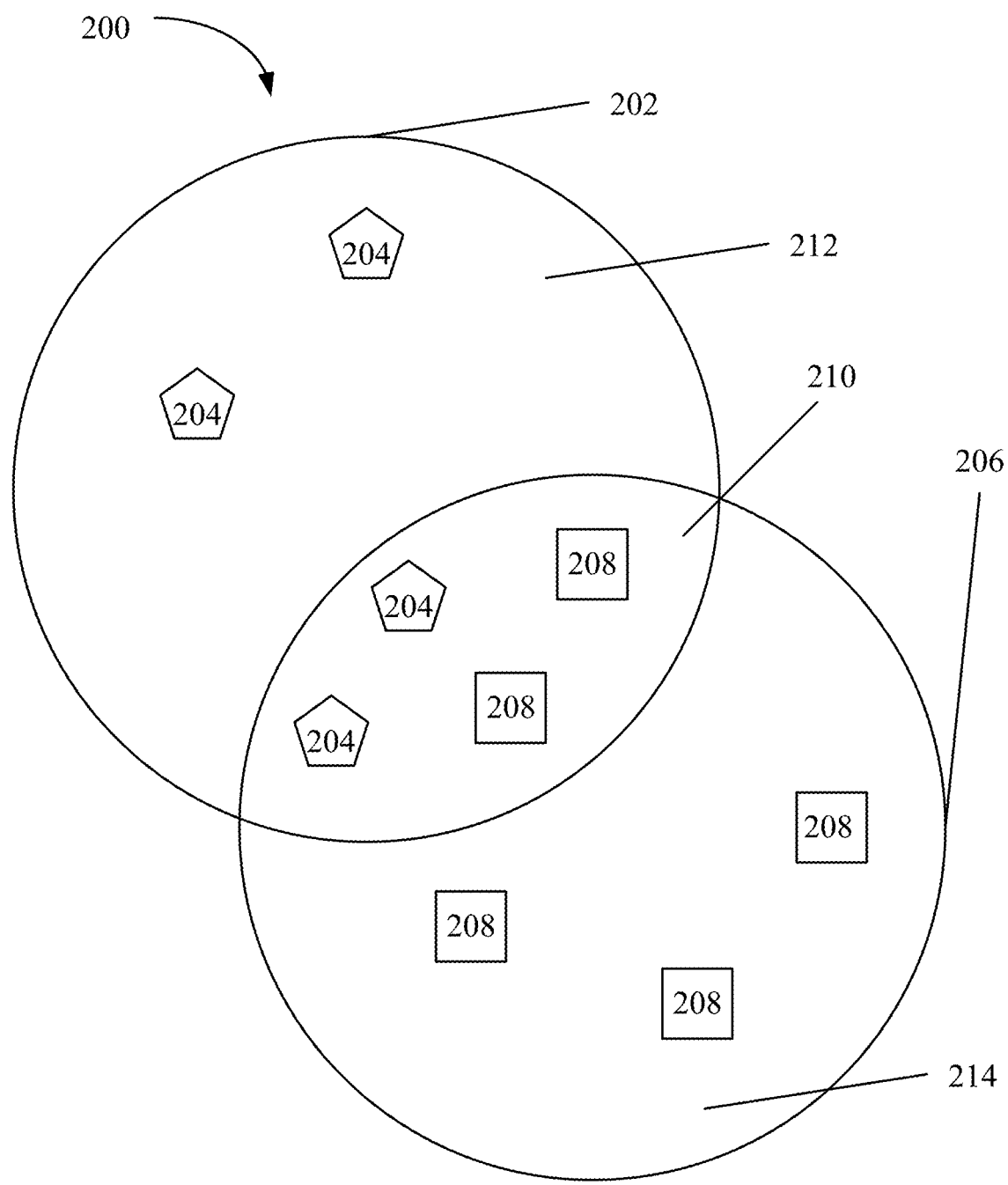
FIG. 2 illustrates a system according to an embodiment of the invention.

FIG. 2 illustrates a system 200 according to an embodiment of the disclosure. The system 200 includes a first network 202 and a second network 206. The first network 202 includes one or more first network devices 204, and the second network includes one or more second network devices 208. In FIG. 2, the boundary of the first network 202 is shown to intersect the boundary of the second network 206 to form a Venn diagram representing channels available to each network. That is, first network devices 204 may have first network channels 212 not available to second network devices 208, second network devices 208 may have second network channels 214 not available to first network devices 204, and both first network devices 204 and second network devices 208 may have overlapping network channels 210 available to both types of network devices. Both types of network devices may use the overlapping network channels 210 for communication. The overlapping network channels 210 may indicate an overlap in communication frequency or frequency bands for both the first network 202 and the second network 206. According to an embodiment of the disclosure, the first network 202 may be an LTE network with first network devices 204 including base stations, transmitters, Evolved Node B (eNodeB or eNB), terminals, mobile phones, any LTE based transmitter, and so on, and the second network 206 may be a Wi-Fi network with Wi-Fi devices or a Zigbee or Bluetooth network with wireless devices operating in an unlicensed 2.4 GHz band. Base stations in the first network 202 may be configured to perform base station to device or terminal communications with terminals or devices in either of the first network 202 or the second network 206. Terminals in the first network 202 may be configured to perform device-to-device communications in either of the first network 202 or the second network 206.

Figure 3:
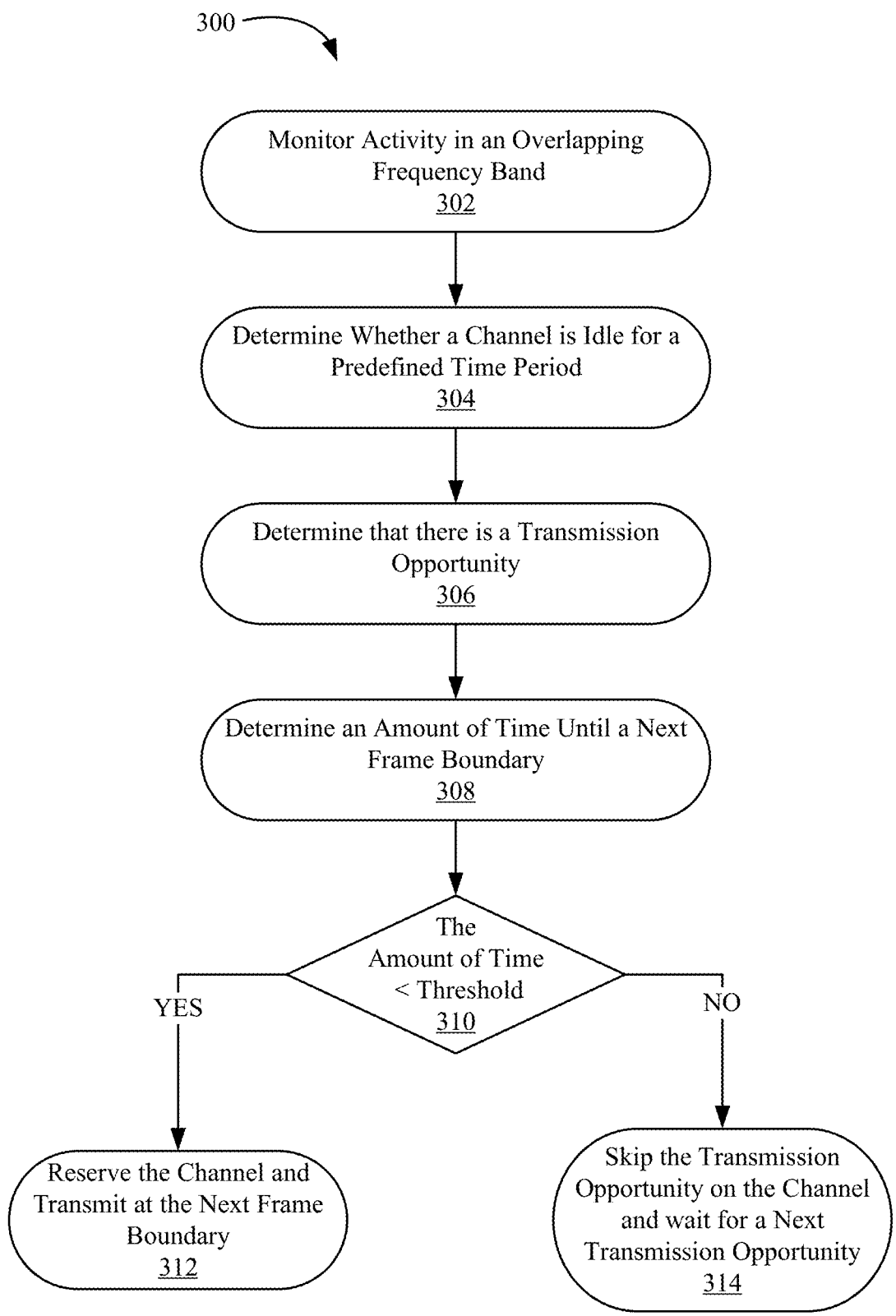
FIG. 3 is a flow diagram for data transmission according to an embodiment of the invention.

FIG. 3 is a flow diagram 300 for data transmission according to an embodiment of the disclosure. At step 302, the first network device 204 monitors activity in the overlapping frequency bands, for example, in one channel of the overlapping network channels 210. At step 304, the first network device 204 determines whether the channel in the overlapping network channels 210 is idle for a predefined time period as discussed above with respect to several time periods, for example, LIFS, DIFS, AIFS, etc.

At step 306, based on the channel being idle for the predefined time period, the first network device 204 determines that it has a transmission opportunity on the channel. At step 308, the first network device 204 measures an amount of time until a next frame boundary, for example, $T_{res}$ as defined above.

At step 310, the first network device 204 determines whether the amount of time until the next frame boundary is below a threshold. At step 312, in response to the amount of time until the next frame boundary being below the threshold, the first network device 204 reserves the channel for a fixed duration of time, for example, $T_{LBT}$ as shown in FIG. 1, and then the first network device 204 transmits data at the next frame boundary. At step 314, in response to the amount of time until the next frame boundary being above the threshold, the first network device 204 skips the transmission opportunity on the channel and waits for a next transmission opportunity.

Simulation Results for Exemplary Embodiments

Future mobile networks will exploit unlicensed spectrum to boost capacity and meet growing user demands cost-effectively. The 3GPP has recently defined an LAA scheme to enable global U-LTE deployment, aiming at (1) ensuring fair coexistence with incumbent Wi-Fi networks, i.e., impacting on their performance no more than another Wi-Fi device, and (2) achieving superior airtime efficiency as compared to Wi-Fi. This example will show the standardized LAA fails to simultaneously fulfill (1) and (2). This example will provide alternative orthogonal (collision-free) designs for LBT coexistence paradigm that provides a substantial improvement in performance, yet imposes no penalty on existing Wi-Fi networks. Two LAA optimal transmission policies, ORLA and OLAA, that maximize LAA throughput in both asynchronous and synchronous (i.e., with alignment to licensed anchor frame boundaries) modes of operation, respectively, are described. Performance evaluation demonstrate that, when aggregating packets, IEEE 802.11ac Wi-Fi can be more efficient than 3GPP LAA, whereas some exemplary embodiments can attain 100% higher throughput, without harming Wi-Fi. Performance evaluation further demonstrate that long U-LTE frames may incur up to 92% throughput losses on Wi-Fi when using 3GPP LAA, whilst ORLA and OLAA sustain >200% gains at no cost, even in the presence of non-saturated Wi-Fi and/or in multi-rate scenarios.

ORLA (asynchronous modes of operation): Optimal LBT transmission policies for asynchronous LBT WNs coexisting with Wi-Fi is derived here. A first consideration is addressing airtime maximization under circumstances where Wi-Fi contenders are backlogged (saturated) and operate with the same PHY bit rate (homogeneous), then a second consideration is maximizing airtime usage when Wi-Fi is lightly loaded (non-saturated) and stations employ dissimilar rates (heterogeneous links).

Homogeneous and Saturation Conditions (First Consideration): Assume ideal physical layer conditions, i.e., LBT and Wi-Fi WNs are within carrier sensing range of each other (no hidden terminals), no capture effect, and perfect PHY rate control mitigates channel errors. With these assumptions, losses due to fading are negligible. These assumptions not only ensure mathematical tractability but focused analysis. Additionally, assume LBT WNs equipped with an off-the-shelf Wi-Fi interface for channel sensing and medium access reservation purposes, in addition to the native LTE modem. This is common practice in coexistence mechanism design.

Consider a scenario with n saturated Wi-Fi WNs, i.e., each WN always has data ready for transmission. Under these conditions the transmission attempt probability $\tau_i^{(n)}$ of a station i in random MAC slot can be related to the conditional collision probability $p^{(n)}$. In an embodiment, given the homogeneous load assumption, $\tau^{(n)} = \tau_i^{(n)}$ for all $i \in \{1, \ldots, n\}$, $\tau^{(n)}$ can be computed by solving the following system of non-linear equations:

$$\begin{cases} \tau^{(n)} = \frac{2(1-2p^{(n)})}{(1-2p^{(n)})(CW_{min}+1)+p^{(n)}CW_{min}(1-(2p^{(n)})^m)} \\ p^{(n)} = 1-(1-\tau^{(n)})^{n-1} \end{cases}$$

where $CW_{min}$ is the contention window minimum parameter and m is the back-off stage. Then, the probability that a MAC slot is idle is given by the probability that none of the stations transmits, i.e., $P_{idle}^{(n)} = (1-\tau^{(n)})^n$; the probability that a slot is occupied by a successful transmission is $P_{succ}^{(n)} = np_{succ}^{(n)}$, where $p_{succ}^{(n)} = \tau^{(n)}(1-\tau^{(n)})^{n-1}$ is the probability that a single station transmits in a MAC slot. Finally, the probability that a slot is occupied by a collision is given by $P_{coll}^{(n)} = 1 - P_{idle}^{(n)} - P_{succ}^{(n)}$ and the probability of a slot being busy is $P_{tx}^{(n)} = P_{coll}^{(n)} + P_{succ}^{(n)}$. The throughput of a Wi-Fi WN is given by:

$$s^{(n)} = \frac{p_{succ}^{(n)} B}{P_{idle}^{(n)} \sigma + (1 - P_{idle}^{(n)}) T} \quad (1)$$

where σ, B, and T are the duration of an (idle) MAC slot, the expected number of bits in a transmission, and the duration of a transmission (successful or collision) respectively, which is equal to:

$$T = T_{PLCP} + \frac{f_{agg}(L_{del} + L_{mac-oh} + L_{pad}) + B}{C} + SIFS + T_{ACK} + DIFS.$$

SIFS, DIFS, $T_{PLCP}$, $L_{del}$, and $L_{pad}$ are PHY layer constants (inter-frame spacing, delimiters, padding), $L_{mac-oh}$ is the MAC layer overhead (header and FCS), $f_{agg}$ is the number of packets aggregated in a transmission, B the expected number of data bits transmitted in the burst (payload), and C the PHY bit rate. The duration of an acknowledgement is:

$$T_{ACK} = T_{PLCP} + \frac{L_{ACK}}{C_{ctrl}},$$

where Carl is the bitrate used for control messages.

The maximum fraction of orthogonal airtime that an LBT WN can use such that the average throughput experienced by a Wi-Fi WN is not degraded more than if another Wi-Fi WN were added to the network can be obtained. Since LBT transmissions following the access procedure in FIG. 1 are orthogonal to Wi-Fi transmissions, an LBT WN can be regarded (in terms of airtime) as a Wi-Fi WN that transmits in MAC slots that otherwise would be idle. Then, the LBT airtime can be expressed as:

$$A_{LBT} = \rho P_{idle}^{(n)} (T'-\sigma) \quad (2)$$

where $\rho \in [0,1]$ is the fraction of idle slots that would change to busy slots, and $(T'-\sigma) := T_{LBT} > 0$ is the duration of an LBT WN transmission, which depends on the LBT mode used (FBE or LBE). Note that the quantity $\rho P_{idle}^{(n)}$ is the fraction of orthogonal LBT transmissions. Using (2), the throughput experienced by a Wi-Fi WN when an LBT WN uses $A_{LBT}$ airtime can be expressed as:

$$s^{(n+LBT)} = \frac{p_{succ}^{(n)} B}{P_{idle}^{(n)} \sigma + P_{tx}^{(n)} T + \rho P_{idle}^{(n)} (T'-\sigma)} \quad (3)$$

The throughput of a station in a WLAN is non-increasing with the number of stations, i.e., $s^{(n)} \geq s^{(n+1)}$ for every n=1, 2, . . . , as such:

$$s^{(n+1)} = \frac{p_{succ}^{(n+1)} B}{P_{idle}^{(n+1)} \sigma + P_{tx}^{(n)} T + \rho P_{idle}^{(n)} T} \leq s^{(n+LBT)} \quad (4)$$

will always hold, provided ρ in (3) is sufficiently small. The value of ρ that makes (4) tight is of interest since it maximizes the LBT airtime. Given the following lemma:

Lemma 2: Consider a WLAN with n homogeneous stations in saturated conditions. Suppose T,T'>σ. Then, (4) holds for every $\rho \in [0, \bar{\rho}]$ with $$\bar{\rho} := \left(\frac{T-\sigma}{T'-\sigma}\right) \min\left\{1, \frac{P_{tx}^{(n+1)}}{p_{succ}^{(n+1)}} \frac{p_{succ}^{(n)}}{P_{idle}^{(n)}} - \frac{P_{tx}^{(n)}}{P_{idle}^{(n)}}\right\} \quad (5)$$

Proof: Rearranging terms in (4) with $P_{tx} = (1-P_{idle}^{(n)})$ and $A = \rho P_{idle}^{(n)} (T'-\sigma)$ provides:

$$\frac{p_{succ}^{(n)}}{p_{succ}^{(n+1)}} \geq \frac{P_{idle}^{(n)}(\sigma - T) + T + \rho P_{idle}^{(n)}(T'-\sigma)}{P_{idle}^{(n+1)}(\sigma - T) + T} \quad (6)$$

Further rearranging provides:

$$\rho P_{idle}^{(n)}(T'-\sigma) \leq \frac{p_{succ}^{(n)}}{p_{succ}^{(n+1)}}(P_{idle}^{(n+1)}(\sigma - T) + T) - P_{idle}^{(n)}(\sigma - T) - T$$

$$\rho P_{idle}^{(n)}(T'-\sigma) \leq T\left(\frac{p_{succ}^{(n)}}{p_{succ}^{(n+1)}} - 1\right) + \left(P_{idle}^{(n)} - \frac{p_{succ}^{(n)}}{p_{succ}^{(n+1)}} P_{idle}^{(n+1)}\right)(T-\sigma)$$

And dividing by $P_{idle}^{(n)}(T'-\sigma)$ yields $$\rho \leq \frac{T}{P_{idle}^{(n)}(T'-\sigma)}\left(\frac{p_{succ}^{(n)}}{p_{succ}^{(n+1)}} - 1\right) + \left(1 - \frac{p_{succ}^{(n)}}{p_{succ}^{(n+1)}} \frac{P_{idle}^{(n+1)}}{P_{idle}^{(n)}}\right)$$

Fixing T'=T and noticing that T/(T−σ)>1 provides:

$$\rho \leq \frac{1}{P_{idle}^{(n)}}\left(\frac{p_{succ}^{(n)}}{p_{succ}^{(n+1)}} - 1 + P_{idle}^{(n)} - \frac{p_{succ}^{(n)}}{p_{succ}^{(n+1)}} P_{idle}^{(n+1)}\right)$$

$$\rho \leq \frac{P_{tx}^{(n+1)}}{p_{succ}^{(n+1)}} \frac{p_{succ}^{(n)}}{P_{idle}^{(n)}} - \frac{P_{tx}^{(n)}}{P_{idle}^{(n)}} \quad (7)$$

where in (7), the relationships $1 - P_{idle}^{(n)} = P_{tx}$ and $\rho \leq 1$ have been used. Finally, when T'≠T, since all that matters is the total airtime $A_{LBT}$ given in (2), if (7) is multiplied by $$\frac{T-\sigma}{T'-\sigma},$$

the stated result in (5) follows.

With Lemma 2, the fraction of orthogonal/successful LBT transmissions ($\rho P_{idle}^{(n)}$) of expected duration $T_{LBT} = T - \sigma$ that can be accommodated in order to be compliant with the coexistence criterion can be obtained. The bound in (5) depends on $P_{tx}^{(n+1)}$ and $P_{succ}^{(n+1)}$, however, in saturation conditions a very good approximation of these values can be obtained. That is:

$$P_{idle}^{(n)}\sigma + (1 - P_{idle}^{(n)})T + \rho P_{idle}^{(n)}(T'-\sigma) =$$
$$P_{idle}^{(n)}\sigma + (1 - P_{idle}^{(n)})\left(T + \rho P_{idle}^{(n)} \frac{T'-\sigma}{1 - P_{idle}^{(n)}}\right) =$$
$$P_{idle}^{(n)}\sigma + (1 - P_{idle}^{(n)})(T + \pi(T'-\sigma))$$

where $$\pi = \min\left(1, \overline{\rho}\frac{P_{idle}^{(n)}}{1-P_{idle}^{(n)}}\right) \quad (8)$$

That is, an LBT WN will be compliant with the coexistence criterion as long as it takes a fraction $\pi(\overline{\rho})$ of collision-free LIFS opportunities after a busy slot (successful or collision), where $\overline{\rho}$ is given in (5). In this way, an asynchronous transmission policy referred to as "Orthogonal Random LBT Unlicensed Access" (ORLA) can be provided as in International Patent Publication WO2017/133778. ORLA follows that, considering a policy $\Pi^{ORLA}$ by which an LBT WN initiates transmissions for a fixed duration $T_{LBT}$ after a LIFS opportunity $\omega \in \Omega$ with probability $\pi(\rho)$: $\Pi^{ORLA}(\rho):=\{\omega \in \Omega\, \mathcal{U}_\omega, (\rho)=1\}$, where $\mathcal{U}_\omega(\rho)$, $\omega \in \Omega$ are random variables taking values 0 or 1 such that $\Pr(\mathcal{U}_\omega)(\rho)=1)=\pi(\rho)$. In an homogeneous scenario where all Wi-Fi WNs are saturated and have the same channel access configuration, $\Pi^{ORLA}(\rho)$ is an airtime-optimal policy $\Pi^\ddagger$ and a throughput optimal transmission policy $\Pi^\ddagger$ for synchronous LBT and asynchronous LBT, respectively.

Non-saturation and Heterogeneous conditions: Next, generalizing the results above to heterogeneous conditions in terms of Wi-Fi packet arrival rates and link qualities is considered. Recall that since cellular deployments work permanently on licensed frequencies, the performance of supplemental downlink services exploiting the unlicensed band is investigated for best effort data transfers. As such, consider backlogged LBT WN newcomers (i.e., always having data to transmit) and study the performance of ORLA with (i) practical multi-rate Wi-Fi operation, thus focusing on airtime instead of throughput fairness, while (ii) utilizing additional airtime released by Wi-Fi WNs with finite loads. In an embodiment, the ORLA transmission policy is extended to guarantee that the aggregate channel time of n (non-saturated) Wi-Fi WNs when a saturated Wi-Fi WN, $A^{(n+1)}$, is added remains constant or larger than the aggregate channel time of n saturated Wi-Fi WNs when adding the LBT WN, $A^{(n_{sat}+LBT)}$. Formally, $$A^{(n+1)} = \frac{\sum_{i=1}^{n} p_{succ,i}^{(n+1)} T_{s,i}}{T_{slot}^{(n+1)}} \quad (9)$$

where $T_{slot}^{(n+1)} = P_{idle}^{(n+1)}\sigma + \sum_{i=1}^{n+1} p_{succ}^{(n+1)} T_{s,i} + P_{coll}^{(n+1)} T_c$, with $p_{succ}^{(n+1)}$ being the probability that station i transmits successfully in a MAC slot, $$T_{succ,i} = T_{PLCP} + \frac{f_{agg,i}(L_{del} + L_{mac-oh} + L_{pad}) + B_i}{C_i} + SIFS + T_{ACK} + DIFS$$

being the duration of a slot when WN i transmits successfully, and $T_c$ being the time the channel remains busy during a collision. Note that the numerator in (9) sums over the n (non-saturated) Wi-Fi WNs and not over all the WNs in the system.

To compute the Wi-Fi WNs' transmission attempt rates $\tau_i$, $i=1,\ldots,n$, first rewrite the conditional collision probability $p_i^{(n)}$ that the frames transmitted by WN i experience as:

$$p_i^{(n)} = 1 - \prod_{k=1,k\neq i}^{n} (1-\tau_k^{(n)})$$

A renewal-reward approach may be used to model the Wi-Fi BEB scheme in the presence of different packet arrival rates. To avoid notation clutter, the i and (n) indexes are dropped when there is no scope for confusion. The transmission attempt rate of a Wi-Fi contender can be thus expressed as $$\tau = \frac{E[A]}{E[S]},$$

where $E[A]$ is the expected number of attempts to transmit a packet burst and $E[S]$ is the expected number of slots used during back-off, which is computed as follows: $E[A]=1+p+p^2+\ldots+p^M$, and $E[S]=t_{idle}+b_0+pb_1+p^2b_2+\ldots+p^M b_M$. M is the maximum number of retries (which is assumed equal to the maximum back-off stage $\overline{m}$) and $b_m$ is the mean length of back-off stage m expressed in slots. $t_{idle}$ is the mean idle time that a contender waits for new content after a transmission. Thus, the transmission attempt rate of a Wi-Fi transmitter is expressed as:

$$\tau = \frac{E[A]}{E[S]} = \frac{1+p+p^2+\ldots+p^M}{t_i+b_0+pb_1+p^2b_2+\ldots+p^M b_M} \quad (11)$$

Relating $\tau_i^{(n)}$ to $p_i^{(n)}$ for all i, neglecting post-backoff and assuming no buffering, provides:

$$t_{idle} = q(1+2(1-q)+3(1-q)^2+\ldots) = \frac{1}{q} \quad (12)$$

where q is the probability that a new frame arrives in a uniform slot time $T_{slot}$. Note that, assuming Poisson arrivals, q can be related to a WN offered load $\lambda$ as $\lambda = \log(1-q)/T_{slot}$.

Analogously, $$A^{(n_{sat}+LBT)} = \frac{\sum_{i=1}^{n_{sat}} p_{succ,i}^{(n_{sat})} T_{s,i}}{T_{slot}^{(n_{sat}+LBT)}} \quad (13)$$

where $T_{slot}^{(n_{sat}+LBT)} = T_{slot}^{(n_{sat})} + \rho P_{idle}^{(n_{sat})}(T'-\sigma)$.

where $T_{slot}^{(n_{sat}+LBT)} = T_{slot}^{(n_{sat})} + \rho p_{idle}^{(n_{sat})}(T'-\sigma)$. The remaining task is to find $\rho$, such that lot the following condition is satisfied:

$$A^{(n_{sat}+LBT)} \geq A^{(n+1)} \quad (14)$$

This guarantees that (1) pre-existing Wi-Fi WNs satisfy their traffic demands as if a saturated Wi-Fi WN would be added to the system, and (2) the LBT WN maximizes the channel time devoted to transmission. That is, in a WLAN with n stations operating with different offered loads and transmission bit rates, which shares the channel with an LBT WN, (14) holds for every $\rho \epsilon [0,\overline{\rho}]$, where $\overline{\rho}$ is computed as:

$$\bar{\rho} := \frac{1}{\rho P_{idle}^{(n_{sat})}(T'-\sigma)} \left[ \frac{\sum_{i=1}^{n_{sat}} p_{succ,i}^{(n_{sat})} T_{s,i}}{\sum_{i=1}^{n} p_{succ,i}^{(n+1)} T_{s,i}} T_{slot}^{(n+1)} - T_{slot}^{(n_{sat})} \right] \quad (15)$$

Given $\Pi^{ORLA}$ as described above and a heterogenous scenario where Wi-Fi WNs transmit at different rates and have different loads, $\Pi^{ORLA}(\bar{\rho})$ is an airtime-optimal policy $\Pi_\dagger$ and a throughput optimal transmission policy $\Pi^\ddagger$ for synchronous LBT and asynchronous LBT, respectively, where $\bar{\rho}$ is derived with (15).

The rest of the disclosure provides a performance evaluation of the orthogonal LBT transmission policies, ORLA and OLAA, by means of event-driven simulation. Embodiments of the invention are shown to attain superior throughput as compared to the de facto 3GPP LAA, while being substantially more fair to incumbent Wi-Fi. Simulations are performed considering coexistence with Wi-Fi WNs that implement the IEEE 802.11ac specification, with the parameters summarized in Table I. Performance of both synchronous and asynchronous WNs are examined. The latter employ the 3GPP's LAA protocol with the same contention parameters as Wi-Fi WNs or the ORLA policy. Unless otherwise stated, $CW_{min}=16$, $\bar{m}=4$, $T_{LBT}=1$ ms (i.e. LTE's Transmission Time Interval or TTI), and 64-QAM modulation is employed by both technologies.

Variable Number of Wi-Fi: A first investigation involves the airtime and individual throughput performance of an LBT WN operating with LBT access mechanisms utilizing ORLA and OLAA policies, the benchmark 3GPP LAA, and the legacy Wi-Fi protocol, as the number of (background) Wi-Fi WNs sharing the channel is varied. Backlogged background Wi-Fi transmitters are considered, first working with $f_{agg}=1$ and payload B=1500B, and subsequently aggregating 10 packets (i.e., $f_{agg}=10$) and sending B=15000B upon each attempt. In these experiments, the coexisting LTE WN works with $T_{LBT}=1$ ms. Measurement results are presented in FIG. 4. FIG. 4 shows airtime and throughput performance of an LBT WN (triangles) operating with ORLA and OLAA, the benchmark 3GPP LAA, and the legacy Wi-Fi stack, sharing the medium with a variable number of Wi-Fi WNs. Performance of a background Wi-Fi station shown with crosses.

Notice first the behavior of 3GPP LAA and background Wi-Fi WNs when the latter transmits bursts of B=1500B (the red points FIGS. 4(a)-(b)). Clearly, LAA consumes almost 6× more airtime when the number of Wi-Fi contenders is small, which results in up to a 2-fold reduction in the throughput of a Wi-Fi WN (blue line vs. red crosses). This violates the first coexistence criterion, i.e., not harming the performance of incumbent Wi-Fi. In contrast, both ORLA and OLAA, safeguard Wi-Fi throughput (overlapping green crosses and blue line), while the LBT WN consumes additional airtime more wisely, almost doubling MAC throughput efficiency (which is the second coexistence criterion) without negatively impacting on Wi-Fi (green circles). As such, 3GPP LAA attains more throughput as compared to ORLA though at the mentioned price (FIG. 4(a)), though in synchronous mode of operation where frame alignment is required, the throughput performance of OLAA and 3GPP LAA are comparable, but ORLA consumes half the airtime thereby giving more opportunities to Wi-Fi and ensures harmless operation (FIG. 4(b)).

When Wi-Fi WNs transmit large payloads, i.e., MPDU=15000B, 3GPP LAA does not harm Wi-Fi performance, but neither does it attain superior throughput efficiency (FIGS. 4(c)-(d)). Although the relative airtime of the two technologies is comparable, 3GPP LAA exhibits inferior throughput, even more so when operating synchronously, in which case throughput performance of LBT can be even less than half of that of Wi-Fi (FIG. 4(d)). Unlike the 3GPP benchmark, ORLA and OLAA do consume more airtime, though without affecting Wi-Fi performance (again green crosses overlapping with blue line). This leads to a constant throughput gain, irrespective of the number of contenders. Importantly, under synchronous operation OLAA achieves twice the throughput of the 3GPP benchmark. These results suggest that IEEE 802.11ac may prove more efficient than 3GPP LAA, whereas ORLA and OLAA coexistence schemes bring up to 100% throughput gain without harming Wi-Fi.

TABLE 1

IEEE 802.11ac parameters used for simulation

| | |
|---|---|
| Slot Duration ($\sigma$) | 9 µs |
| DIFS | 34 µs |
| SIFS | 16 µs |
| PLCP Preamble and Headers Duration ($T_{PLCP}$) | 40 µs |
| MPDU Delimiter Field ($L_{del}$) | 32 bits |
| MAC Overhead ($L_{mac-oh}$) | 288 bits |
| ACK Length ($L_{ACK}$) | 256 bits |
| Data bit rate (C) | 130 Mb/s |
| Control bit rate ($C_{ctrl}$) | 24 Mb/s |

Effects of contention parameters: In an embodiment, since the 802.11 standards allows for adapting the contention settings ($CW_{min}$ and $CW_{max}$), the performance gains LBT may obtain under different configurations, and irrespectively, any losses incurred onto Wi-Fi may be quantified. To this end, consider both synchronous and asynchronous LBT operation, fixed LBT frame size (1 ms), different Wi-Fi burst sizes (1500 and 15000B), and 4 CW configurations with different aggressiveness, namely (16,512), (32,1024), (32, 256), and (8,256), while varying the number of Wi-Fi WNs. The results of these experiments are illustrated in FIG. 5, where individual throughput gains are plotted with respect to a scenario where the LBT WN were an additional Wi-Fi WN. FIG. 5 shows individual throughput gain different LBT approaches achieve with respect to legacy Wi-Fi for a variable number of background Wi-Fi WNs, different contention settings, and different MPDU sizes where LBT WNs employ asynchronous and synchronous operation.

When the background Wi-Fi stations transmit small payloads and the LBT WN operates with the 3GPP LAA scheme, the difference between contention configurations are subtle. However, the remarkable 3GPP LAA throughput gains are at the expense of Wi-Fi losses (negative gain), as shown in FIG. 5(a). In contrast, OLAA and ORLA impose no penalty on Wi-Fi (observe the constant lines at gain equal to 0%), while achieving throughput gains almost up to 200%. These gains are slightly more prominent when Wi-Fi contends aggressively (i.e. $CW_{min}=8$), which is attributed to more LIFS opportunities higher Wi-Fi attempt rates create. The small differences between contention window parameters become clearer in the bottom of the figure, a zoomed inversion at graph location between 10 and 15 Wi-Fi WNs.

The questionable efficiency of 3GPP LAA in scenarios where Wi-Fi WNs transmit 15000B payloads is confirmed in FIG. 5(b), where OLAA and ORLA incurs no penalty to Wi-Fi WNs (which virtually lie on a gain equal to 0% irrespective of the number of WNs) but 3GPP LAA has between 15 and 60% of throughput loss over the case where it followed the Wi-Fi protocol of the background WNs (this become clearer at the zoomed area, at the bottom part of the figure). In contrast, ORLA and OLAA do not affect Wi-Fi performance in neither asynchronous or synchronous settings. When the number of Wi-Fi WNs is small (mostly less than 5), OLAA does not attain throughput gains because the LBT frame size is fixed and no aggregation is allowed. However, depending on contention setting, individual LBT performance grows to as much as 60% under high contention levels, with both orthogonal coexistence policies.

Impact of LBT Frame and Wi-Fi Burst Durations: Next, further insight is provided into the impact of different Wi-Fi burst sizes, as well as $T_{LBT}$ settings, i.e., the duration for which an LBT holds the channel when transmitting. Understanding the impact LBT may have on Wi-Fi when working with large frame sizes is of interest, since by default LTE operates with 10 ms frames, while the ETSI specification allows transmission in the unlicensed band for up to 8 ms. For this purpose, consider a scenario with 5 backlogged Wi-Fi WNs and the LBT WN operating with 3GPP LAA scheme and with the orthogonal coexistence mechanisms ORLA and OLAA, respectively. Both asynchronous and synchronous operation results are provided. The results of this experiment are shown in FIG. 6, where heatmaps of the throughput gains of both LBT (with each approach) and background Wi-Fi are plotted. FIG. 6 shows individual throughput gain with respect to legacy Wi-Fi when a LBT WN shares the channel with 5 background Wi-Fi WNs. Different LBT frame and Wi-Fi burst sizes are employed.

Under asynchronous operation, it can be seen that the 3GPP LAA may attain as much as 983% throughput gains when working with 10 ms frames. However, this cuts off Wi-Fi transmissions almost completely (92%) throughput loss. Conversely, if Wi-Fi performance is to be preserved, 3GPP LAA has minimal gains as compared to using legacy Wi-Fi, and may even be 54% less efficient if the background Wi-Fi WNs employ long bursts (FIG. 6(a)). This effect is further exacerbated in the case of synchronous LBTs, as illustrated in FIG. 6(b).

In contrast both ORLA and OLAA achieve more than 200% throughput gains when operating with long LBT frames, without negatively impacting Wi-Fi. Indeed the performance of the incumbent remains unaffected, irrespective of the LBT frame/Wi-Fi burst settings. Furthermore, ORLA achieves improvements even when sending 1 ms frames.

Nonsaturation conditions: Consider circumstances where incumbent Wi-Fi WNs have limited offered load (i.e., nonsaturation). LBT may effectively exploit the additional airtime available in light load regimes, without harming Wi-Fi performance. To this end, consider 5. Wi-Fi WNs transmitting 1500B PDUs and increase their offer load, relative to the load that saturates the network, from 10% (light load) to 100% (saturation conditions). The performance of both LBT and background Wi-Fi is studied when the LBT frame duration is 1 and 10 ms, respectively; the LBT WN operates again with either 3GPP LAA or the orthogonal coexistence schemes ORLA (asynchronous) or OLAA (synchronous) policy. Note however, that aggregation level in this case is automatically adjusted for both ORLA and OLAA.

Figure 7:
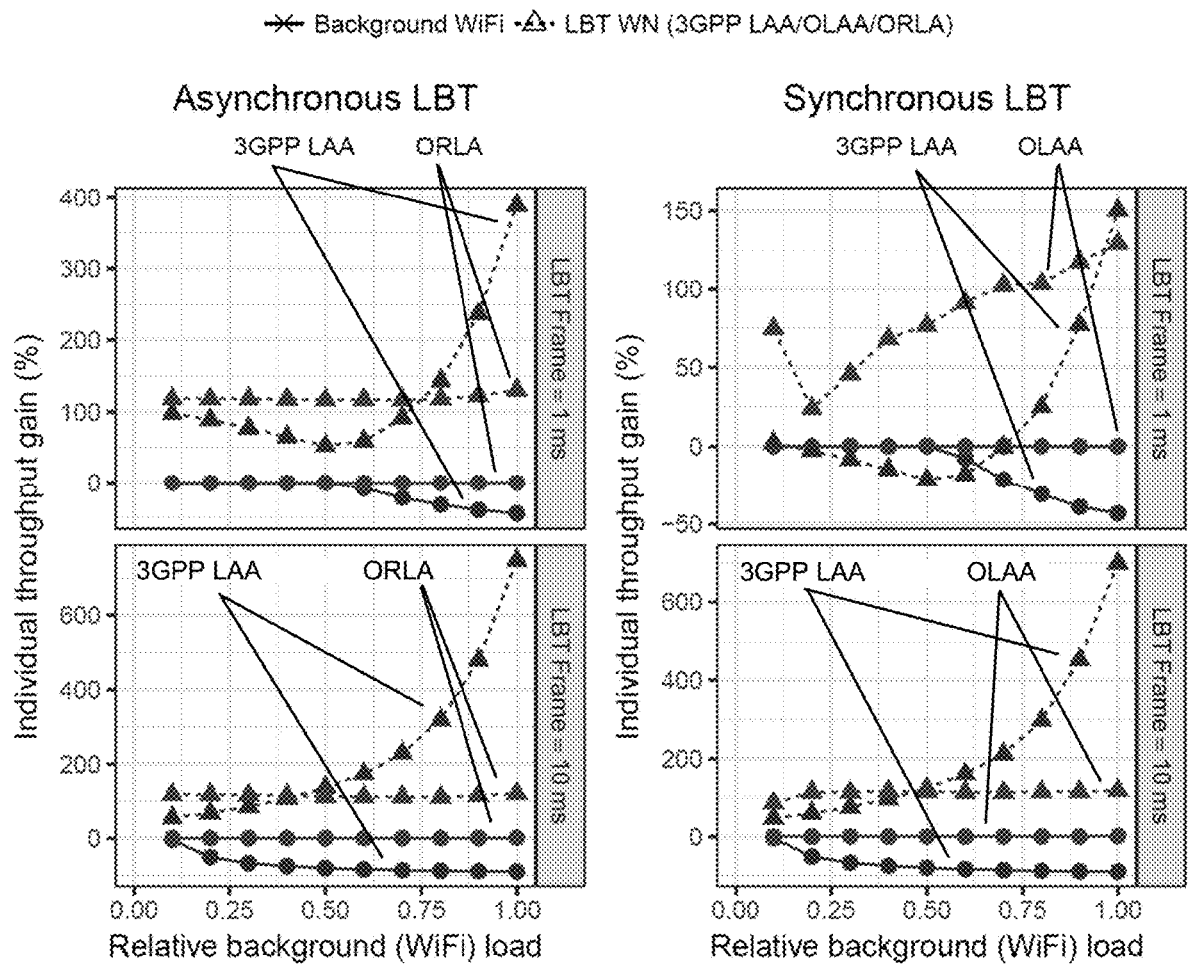
FIG. 7 shows exemplary simulation results according to an embodiment of the invention.

The obtained results are plotted in FIG. 7. FIG. 7 shows individual throughput gain with respect to legacy Wi-Fi when an LBT WN shares the medium with 5 background Wi-Fi WNs, whose offered load increases. It can be seen that 3GPP LAA negatively impacts on Wi-Fi even when lightly loaded. This is more obvious when the frame duration is long (10 ms). When the $T_{LBT}$=1 ms, 3GPP LAA leaves Wi-Fi unaffected but exhibits decreasing performance up to the point where the relative load is precisely 50% (observe the LBT minimum), following which the LBT gain grows at the expense of Wi-Fi. ORLA and OLAA policies do not affect non-saturated Wi-Fi WNs. ORLA provides steady throughput gains above 100% up to the point where the WLAN saturates, and OLAA's performance grows with Wi-Fi activity level, again exceeding 100% improvements.

Heterogeneous Bitrates: Evaluations are concluded by investigating performance of ORLA and OLAA policies in a multi-rate scenario where 5 backlogged Wi-Fi WNs transmit at different bitrates in response to dissimilar channel conditions. Specifically, upon accessing the channel, each transmits 1500B at the following rates {156, 130, 78, 39, 13} Mb/s, respectively. This will yield longer slot durations whenever a slower station transmits, leaving less time available for both LBT and other Wi-Fi contenders. In this scenario, the LBT WN operates with a frame of 1 ms and transmits using 64-QAM (MCS level 6). Comparison is made against the 3GPP LAA benchmark in both asynchronous and synchronous settings.

Figure 8:
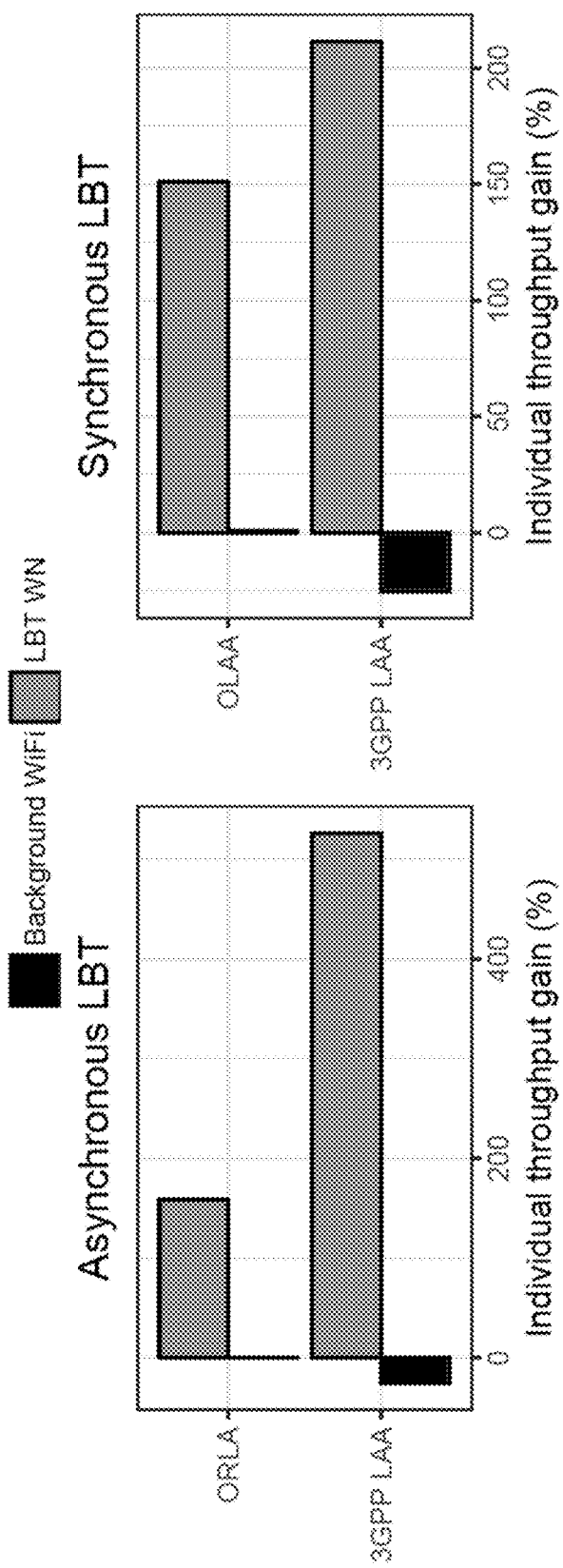
FIG. 8 shows exemplary simulation results according to an embodiment of the invention.

In an embodiment, FIG. 8 shows individual throughput gain with respect to legacy Wi-Fi in multi-rate scenarios where an LBT WN shares the channel with 5 saturated Wi-Fi WNs. Parameters for generation of FIG. 8 include: Wi-Fi's MCS ∈{156, 130, 78, 39, 13} Mb/s, LBT MCS level=6, Wi-Fi MPDU=1500B, and LBT Frame size=1 ms. As seen in FIG. 8, with asynchronous operation the 3GPP LAA attains remarkable gains as compared to legacy Wi-Fi (500%), but has a negative impact on the Wi-Fi contenders. In contrast, ORLA ensures harmless coexistence, while still providing nearly 200% throughput gains. When the LBT transmissions align to frame boundaries (synchronous LBT), the 3GPP LAA's gains are less impressive, while Wi-Fi is more severely affected. The results obtained indicate that OLAA policy does not inflict penalties onto Wi-Fi also in this case, while still achieving 150% performance gains.

To enable LTE deployment in unlicensed bands and seamless integration with existing cellular systems, 3GPP has recently specified an LBT-based solution named Licensed Assisted Access (LAA). Despite its potential to attain superior user multiplexing and robustness (e.g., via Hybrid ARQ error recovery), it is shown that the 3GPP LAA improves 802.11 MAC efficiency at the cost of penalizing incumbent Wi-Fi networks, and with 3GPP LAA configurations that are completely fair to Wi-Fi, achieving inferior MAC performance compared to 802.11. ORLA and OLAA are presented as radically different approaches to coexistence in unlicensed bands, which overcomes the limitations of 3GPP LAA and is compliant with the listen-before-talk requirement of, e.g., ETSI's EN 301 893 regulation. Embodiments of the disclosure build a symbiotic relationship between incumbent Wi-Fi and U-LTE that creates orthogonal airtime blocks for each system, thereby avoiding collisions between them and substantially increasing the MAC layer efficiency of both technologies. Based on this orthogonal access procedure, optimal transmission policies, namely ORLA and OLAA, for asynchronous and synchronous systems are derived, which maximize U-LTE throughput, yet cause no harm to background Wi-Fi networks. Finally, by means of extensive system-level simulations, the transmission policies attain LBT throughput gains above 200% with no negative impact on Wi-Fi.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a plurality of wireless networks, comprising at least two different wireless networks operating at least in part in overlapping frequency bands, the method comprising:
    monitoring, by a first wireless transmitter in a first one of the wireless networks, activity in the overlapping frequency bands;
    determining, by the first wireless transmitter, whether a channel in the overlapping frequency bands is idle for a predefined time period;
    based on the channel being idle for the predefined time period, determining that the first wireless transmitter has a transmission opportunity on the channel;
    measuring, by the first wireless transmitter, an amount of time until a next frame boundary on the channel;
    based on the amount of time until the next frame boundary being below a threshold, reserving, by the first wireless transmitter, the channel for a fixed duration of time, and transmitting data at the next frame boundary, wherein the threshold is determined based on evaluating min$(T_{LBT}(1-\lambda), \pi(\rho)T_{LBT})$, wherein $T_{LBT}$ is the fixed duration of time, $\lambda$ is a load of the first network transmitter, and $\pi(\rho)$ is a fraction of transmission opportunities on the channel; and
    based on the amount of time until the next frame boundary being above the threshold, skipping, by the first wireless transmitter, the transmission opportunity on the channel and waiting for a next transmission opportunity.

2. The method according to claim 1, wherein the first wireless transmitter is a base station (BS) which performs BS-to-device communication or a terminal which performs device-to-device communication.

3. The method according to claim 1, wherein the first wireless transmitter reserves the channel for the fixed duration of time by sending a Clear-to-Send (CTS)-to-self message.

4. The method according to claim 1, wherein the fixed duration of time comprises the amount of time until the next frame boundary and a data transmission time, wherein the data transmission time is an amount of time that the first wireless transmitter spends in transmitting the data.

5. The method according to claim 1, wherein the first wireless transmitter is a frame based equipment.

6. The method according to claim 1, wherein the predefined time period is a Long-Term Evolution inter-frame space (LIFS).

7. The method according to claim 1, wherein the threshold is determined based on an activity level in the overlapping frequency bands.

8. The method according to claim 1, wherein the first wireless network is a Long-Term Evolution (LTE) network and the overlapping frequency bands comprises unlicensed National Information Infrastructure (NII) channels.

9. The method according to claim 1, wherein determining, by the first wireless transmitter, whether a channel in the overlapping frequency bands is idle is performed after detecting a successful packet transmission in the channel.

10. The method according to claim 9, wherein the packet successfully transmitted in the channel is a packet from a second wireless transmitter in a second one of the wireless networks.

11. The method according to claim 10, wherein the first wireless network is a Long-Term Evolution (LTE) network, the second wireless network is a Wi-Fi network, and the overlapping frequency bands comprises unlicensed National Information Infrastructure (NII) channels.

12. A system for operating a plurality of wireless networks, comprising:
    at least a first wireless transmitter operable in at least a first wireless network which has overlapping frequency bands with a second wireless network, the first wireless transmitter being configured to:
    monitor activity in the overlapping frequency bands;
    determine whether a channel in the overlapping frequency bands is idle for a predefined time period;
    based on the channel being idle for the predefined time period, determine that the first wireless transmitter has a transmission opportunity on the channel;
    measure an amount of time until a next frame boundary on the channel;
    based on the amount of time until the next frame boundary being below a threshold, reserve the channel for a fixed duration of time and transmit data at the next frame boundary, wherein the threshold is determined based on evaluating min$(T_{LBT}(1-\lambda), \pi(\rho)T_{LBT})$, wherein $T_{LBT}$ is the fixed duration of time, $\lambda$ is a load of the first network transmitter, and $\pi(\rho)$ is a fraction of transmission opportunities on the channel; and
    based on the amount of time until the next frame boundary being above the threshold, skip the transmission opportunity on the channel and wait for a next transmission opportunity.

13. The system according to claim 12, wherein the first wireless network is a Long-Term Evolution (LTE) network and the overlapping frequency bands comprises unlicensed National Information Infrastructure (NII) channel.

* * * * *